United States Patent
Borchers et al.

(10) Patent No.: US 12,382,874 B2
(45) Date of Patent: Aug. 12, 2025

(54) BALING APPARATUS

(71) Applicant: AGCO International GmbH, Neuhausen (CH)

(72) Inventors: Jürgen Borchers, Wolfenbuttel (DE); Malte Cornelius Schlichting, Wolfenbuttel (DE)

(73) Assignee: AGCO International GmbH, Neuhausen (CH)

( * ) Notice: Subject to any disclaimer, the term of this patent is extended or adjusted under 35 U.S.C. 154(b) by 762 days.

(21) Appl. No.: 17/661,681

(22) Filed: May 2, 2022

(65) Prior Publication Data
US 2022/0356040 A1  Nov. 10, 2022

(30) Foreign Application Priority Data

May 4, 2021 (GB) ..................................... 2106326

(51) Int. Cl.
  *A01F 15/08* (2006.01)
  *A01F 15/07* (2006.01)

(52) U.S. Cl.
  CPC .............. *A01F 15/08* (2013.01); *A01F 15/07* (2013.01)

(58) Field of Classification Search
  CPC ...... A01F 15/07; A01F 15/0715; A01F 15/08; A01F 2015/072; A01F 2015/073; A01F 2015/076; B65H 16/005; B65H 2710/20
  See application file for complete search history.

(56) References Cited

U.S. PATENT DOCUMENTS

| 5,813,204 | A | 9/1998 | Pecenka et al. |
| 5,996,307 | A | 12/1999 | Niemerg et al. |
| 8,192,130 | B2 * | 6/2012 | Clark ...................... A01K 5/005 241/101.76 |
| 9,125,345 | B2 | 9/2015 | Chapon et al. |
| 2013/0125518 | A1 * | 5/2013 | Smith .................. A01F 15/0715 53/582 |
| 2014/0261021 | A1 | 9/2014 | Smith et al. |

(Continued)

FOREIGN PATENT DOCUMENTS

| EP | 1129611 A2 | 9/2001 |
| EP | 1602269 A1 | 12/2005 |
| EP | 2941950 B1 | 12/2017 |

(Continued)

OTHER PUBLICATIONS

UK Intellectual Property Office, Search report for UK Priority Application No. GB2106326.8, dated Oct. 28, 2021.

(Continued)

*Primary Examiner* — Jimmy T Nguyen (57) ABSTRACT

A loading apparatus for loading a roll of binding material into a baler. The loading apparatus includes a first support member supported at a first end, a carriage member slidably mounted on the first support member, the carriage member having a first part and a second part, the second part of the carriage member being hingedly connected to the first part of the carriage member, the second part of the carriage member has first and second side supports and a roll support. A distal end of the second part of the carriage member has an adjustable angle bar in which a first limb of the angle bar also has first and second side supports and a second limb of the angle bar includes the roll support element.

14 Claims, 6 Drawing Sheets

(56) References Cited

U.S. PATENT DOCUMENTS

2015/0296715 A1* 10/2015 Simmons ............. B65H 16/024
56/341

FOREIGN PATENT DOCUMENTS

| EP | 3459342 A1 | | 3/2019 | | |
|----|------------|---|--------|---|---|
| EP | 3459342 B1 | | 6/2020 | | |
| EP | 3760029 A1 | | 1/2021 | | |
| GB | 2594457 A | * | 11/2021 | ......... | A01F 15/0715 |

OTHER PUBLICATIONS

European Patent Office, International Search Report related to Application No. EP 22171412, mail date Oct. 13, 2022.

* cited by examiner

BALING APPARATUS

FIELD OF THE INVENTION

The present invention relates to a loading apparatus for baling apparatus and in particular for a baling apparatus for producing round bales.

BACKGROUND

Round balers are well known in the art. Such balers pick up a harvested crop and feed the crop into a baling chamber where it is compressed into a cylindrical bale. Before ejecting the formed bale from the baler it is necessary to wrap or bind the formed bale with a binding material. The binding material is typically supplied as roll of binding material. It will be appreciated that such rolls of binding material are a major consumable in the operation of such a baler. Additionally, such rolls of binding material are heavy and cumbersome to manoeuvre. Rolls of binding material typically measure between 122 to 130 centimetres (48 to 51 inches) in length and weigh between 30 and 45 kilograms (70 to 100 pounds). As such, loading such rolls into position onto the baler by an operator, such that the binding material can then be arranged to be delivered into the baling chamber, is a burdensome task, and one that needs to repeated throughout the operation of the baler.

A number of solutions to this problem have been proposed. The present invention aims to provide a better solution.

SUMMARY OF THE INVENTION

According to a first aspect of the present invention, a loading apparatus for loading a roll of binding material into a dispensing apparatus of a baler from which the binding material may be dispensed comprises a first support member supported at a first end, a carriage member slidably mounted on the first support member, the carriage member comprising a first part and a second part, the second part of the carriage member being hingedly connected to the first part of the carriage member, the second part of the carriage member being provided with first and second side support elements and a roll support element characterised in that a distal end of the second part of the carriage member is provided with an adjustable angle bar, a first limb of the angle bar comprising further first and second side support elements and a second limb of the angle bar provided with the roll support element.

Preferably the distal end of the second part of the carriage member is provided with a handle.

Preferably the first and second parts of the carriage member are connected by biasing elements. More preferably the biasing elements comprise pneumatic or hydraulic cylinders.

Preferably a first latching element is provided between the carriage member and the first support element.

Preferably a second latching element is provided between the angle bar and the second part of the carriage member.

Preferably the roll support element is further provided with a centring element. More preferably the centring element is mounted for pivotable movement on the second limb of the angle bar. Even more preferably a third latching element is provided between the centring element and the second limb of the angle bar 30.

According to a second aspect of the present invention, a baler comprises a baler frame and a loading apparatus in accordance with the first aspect of the present invention.

This has as an advantage that the task of management of the rolls of binding material is made substantially easier.

Preferably the first end of first support is pivotally connected to the baler frame.

According to a third aspect of the invention, a method of operating the apparatus of first aspect of the present invention comprises the steps of
a) sliding the carriage member out along first support
b) pivoting the second part of the carriage member down with respect to the first part of the carriage member
c) pivoting the angle bar from a first to a second position to move the roll support element from a first to a second position
d) locating a first end of a roll of binding material on the roll support element
e) pivoting the angle bar to move the roll support element from the second to the first position
f) pivoting the second part of the carriage member up with respect to the first part of the carriage member
g) sliding the carriage member back along the first support.

Preferably the method additionally comprises the steps of unlatching the carriage member from the first support member before step a) and relatching the carriage member to the first support member after step g).

According to a fourth aspect of the invention, a method of operation of operating a loading apparatus in a baler according the second aspect of the invention, the baler further comprising a binding material storage apparatus including a second support member releasably secured at a second end to a second side of the binding material storage apparatus comprises the steps of
a) releasing the second end of the second support member from the second side of the binding material storage apparatus
b) sliding the carriage out along the first support
c) pivoting the second part of the carriage member down with respect to the first part of the carriage member
d) pivoting the angle bar from a first position to a second position to move the roll support element from a first to a second position
e) locating a first end of a roll of binding material on the roll support element
f) pivoting the angle bar to move the roll support element from the second position to the first position
g) pivoting the second part of the carriage member up with respect to the first part of the carriage member so as to introduce the second end of the second support member into a second end of the roll of binding material
h) sliding the carriage member back along the first support and so the roll of binding material over the second support member
i) raising the first support member to reengage the second end of the second support member with the second side of the binding material storage apparatus.

BRIEF DESCRIPTION OF THE DRAWINGS

The invention will now be described, by way of example only, with reference to the accompanying drawings, in which.

DETAILED DESCRIPTION OF SPECIFIC EMBODIMENTS OF THE INVENTION

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Reference to terms such as longitudinal, transverse and vertical are made with respect to a longitudinal vehicle axis which is parallel to a normal forward direction of travel.

Figure 1:
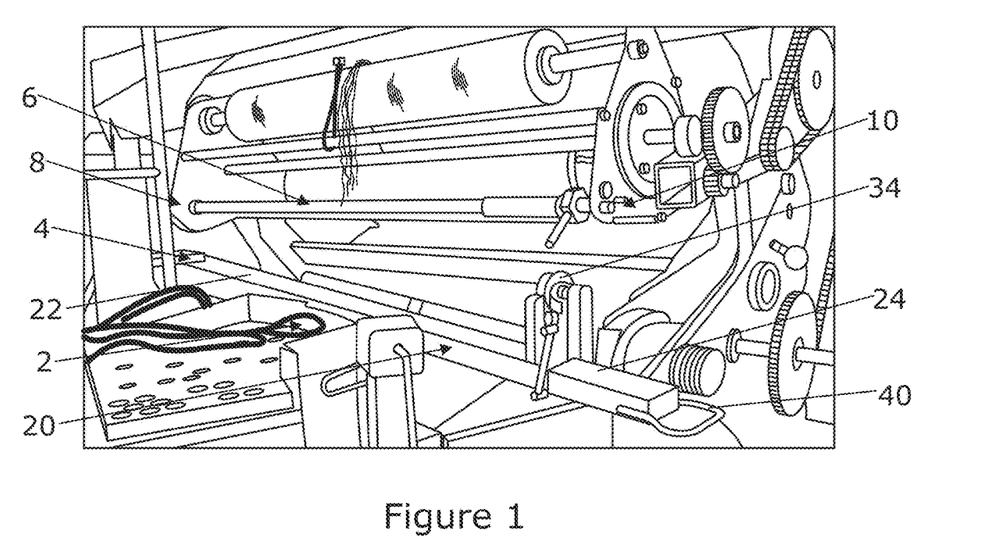
FIG. 1 shows a view of a loading apparatus in accordance with the present invention in an initial position.

With reference first to FIG. 1, a loading apparatus is shown in an initial position in which there is no roll of binding material present. A roll of binding material typically comprises a hollow tube, typically a cardboard tube about which a binding material has been wound. In use, it will understood that the loading apparatus will mostly present such a tube for removal from the loading apparatus, and that such a tube can readily be removed without the level of physical exertion required for manoeuvring a full roll of binding material.

The loading apparatus comprises a first (generally horizontally oriented) support member 2 pivotally connected at a first end 4 to a first side of a frame of a baler 3. A second (horizontally oriented) support member 6 is pivotally connected at a first end 8 to a first side of a storage apparatus forming part of the baler 3. The second support member 6 is releasably connected at a second end 10 to a second side of a storage apparatus forming part of the baler 3. The second support member 6 is conveniently connected at the second end 10 to the storage apparatus by a releasable latch mechanism.

Figure 7:
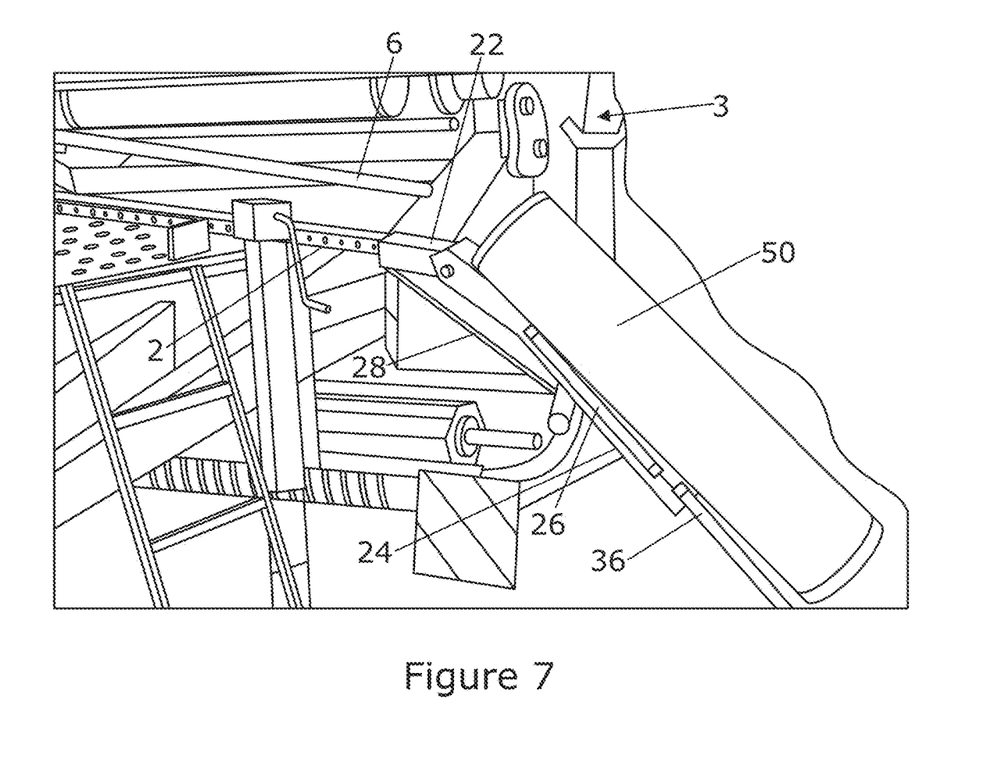
FIG. 7 shows a view of a sixth stage of loading the loading apparatus of FIG. 1.

A carriage member 20 is slidably mounted to the first support member 2. As may be best seen in FIG. 7, the carriage member 20 comprises a first part 22 and a second part 24. The first part 22 of the carriage member 20 is hingedly connected to the second part 24. When the carriage member 20 is slid along the first support member 2 away from the first side of the baler, such that only the first part 22 is supported by the first support member 2, the second part 24 is able to pivot downward.

Figure 3:
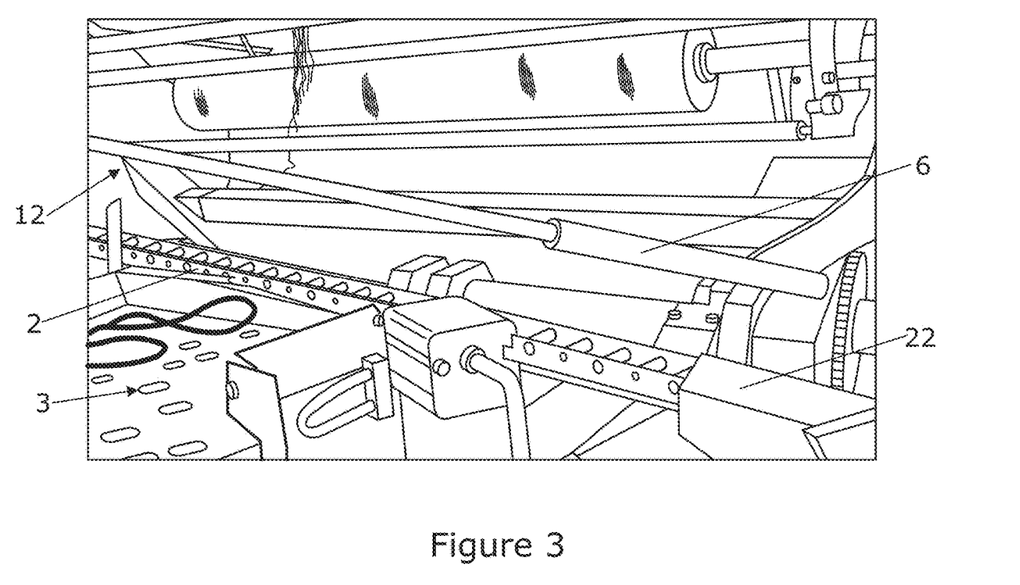
FIG. 3 shows a view of a second stage of loading the loading apparatus of FIG. 1.
Figure 4:
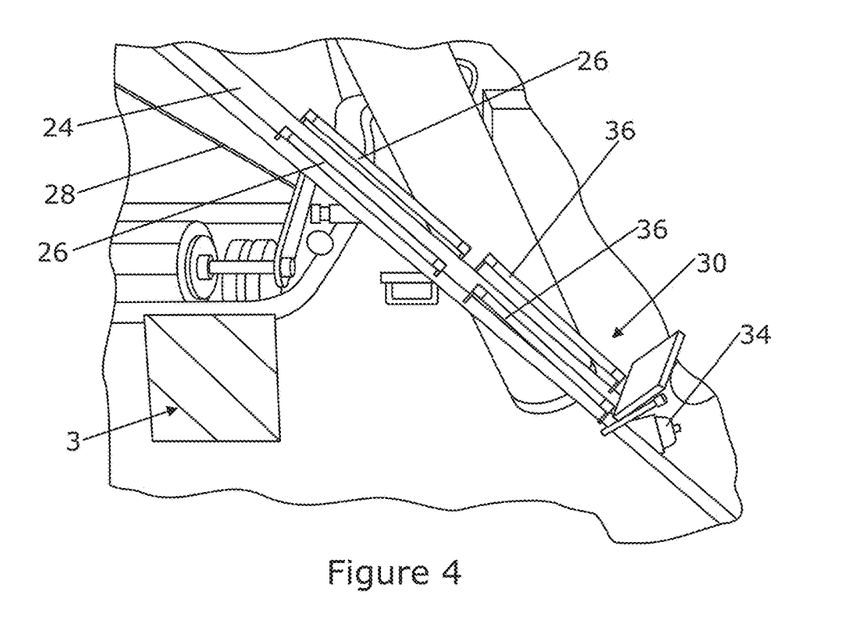
FIG. 4 shows a view of a third stage of loading the loading apparatus of FIG. 1.

A stand 12 is provided toward the first end of the first support member 2 to support the second support member 6 once it has been released from the second side of the dispensing apparatus (FIG. 3). The stand 12 may be located on the first support member 2 or provided on the baler frame adjacent the first support member 2. In a preferred embodiment, the stand 12 is pivotally mounted to the baler frame and is biased such that it moves into an upright position when the carriage member is pulled out. It will be appreciated in each case that the location of the stand 12 with respect to the first support member 2 is positioned so that it does not interfere with the loading of a roll of binding material 50.

It will be understood that the first part 22 of the carriage member 20 is provided with a suitable mechanism to prevent the carriage member 20 from becoming removed from the first support member 2, for example an internal stop for abutment with a second end of the first support member 2.

The second part 24 of the carriage member 20 is provided with first and second side support elements 26 along a middle portion of its length. Conveniently the first and second parts 22,24 of the carriage member 20 are connected by a biasing means 28, such as a gas strut, to assist in the controlled movement of the second part 24 with respect to the first part 22.

Toward the end of the second part 24 of the carriage member 20 remote from the first part 22, that is the distal end of the second part 24 of the carriage member 20, the second part 24 is provided with a pivoting angle bar 30. The angle bar 30 comprises first and second limbs arranged substantially perpendicular to on another. The first limb of the angle bar 30 comprises first and second side support elements 36. It can be seen that the first and second side support elements 36 of the angle bar 30 align with the first and second side support elements 26 of the second part 24 of the carriage member 20 when the angle bar 30 is in a first position (FIGS. 1 to 4). The second limb of the angle bar 30 comprises a substantially U-shaped element 32.

Preferably, a centring element 34 is mounted to the angle bar 30 for a pivoting movement about an axis with respect to the U-shaped element 32 between a first position in which the centring element 34 is releasably secured, for example by a releasable latch mechanism 38, to the U-shaped element 32 and a second position pivoted away from the U-shaped element 32. The centring element 34 is typically part frustoconical in form and may be manufactured from any suitable material, for example from a plastics material.

In an alternative embodiment (not shown), the centring element may be omitted. In such a construction, the limbs of the U-shaped element 32 of the second limb of the angle bar are conveniently sized and shaped to receive the hollow tube of the roll of binding material while an edge of the binding material wrapped about the tube is supported by a surface of the U-shaped element 32. The distal end of the second part of the carriage member may be provided with an abutment surface in the region of the angle bar. In such an embodiment, pivoting of the angle bar is constrained by abutment of the stop with the abutment surface. The depending wings and the abutment surface are selected such that when the second part of the carriage is in the second position and the angle bar is moved to the second position, the U-shaped element 32 is arranged substantially parallel to a ground surface.

At the end of the second part 24 of the carriage member 20 remote from the first part 22, the second part 24 is provided with a manipulation means 40 in the form of a handle by which an operator can manoeuvre the carriage member 20 with respect to the baler.

Figure 2:
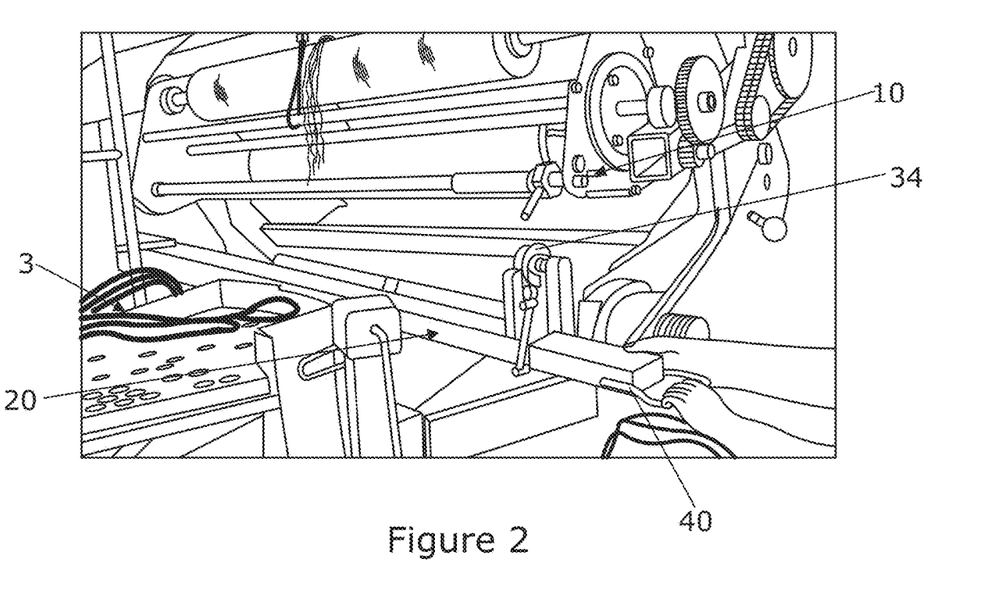
FIG. 2 shows a view of a first stage of loading the loading apparatus of FIG. 1.

Operation of the loading apparatus will now be described by reference to the accompanying Figures. An operator first slides the carriage member 20 out from the frame of the baler 3 using the handle 40 (FIG. 2).

Once the carriage member 20 has been pulled to the end of the first support member 2, the operator allows the second part 24 of the carriage member 20 to pivot downwards (FIGS. 3 and 4) such that the free end of the carriage member 20 rests upon the ground.

The second end 10 of the second support member 6 is also released from the second side of the dispensing apparatus. It will be appreciated that once the second end of the second support member 6 has been released an empty tube of an expended roll of binding material, if present, can readily be slid along the second support member 6 and so removed from the second support member 6.

Figure 5:
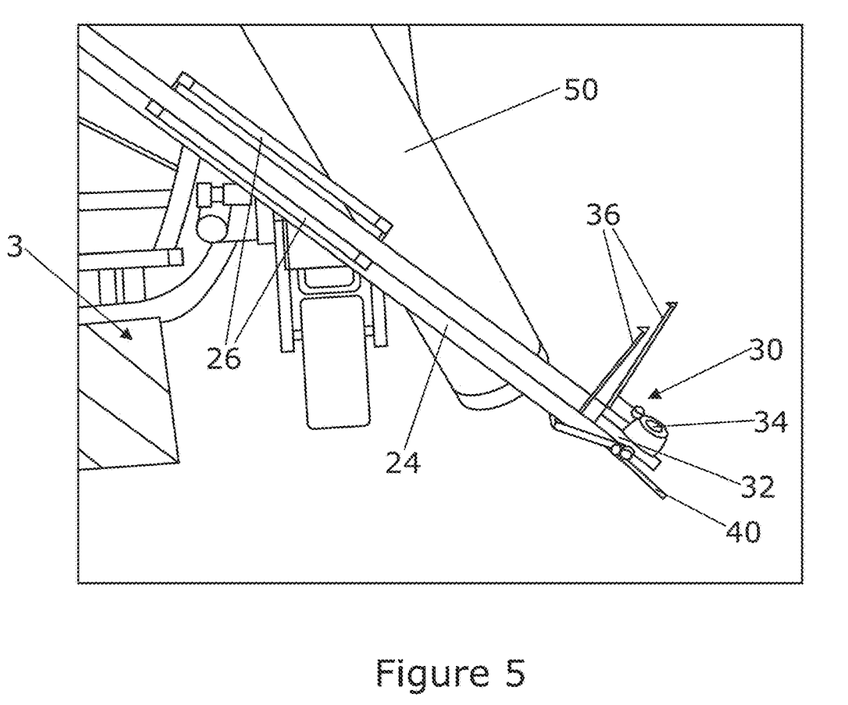
FIG. 5 shows a view of a fourth stage of loading the loading apparatus of FIG. 1.

The operator then pivots the angle bar 30 away from the second part 24 of the carriage member 20 to raise the second side support elements 36 until the U-shaped element 32 is supported in a second position on the free end of the second part of the carriage member 20 (FIG. 5). Optionally a latching mechanism may be provided temporarily to hold the U-shaped element 32 in this position.

Figure 6:
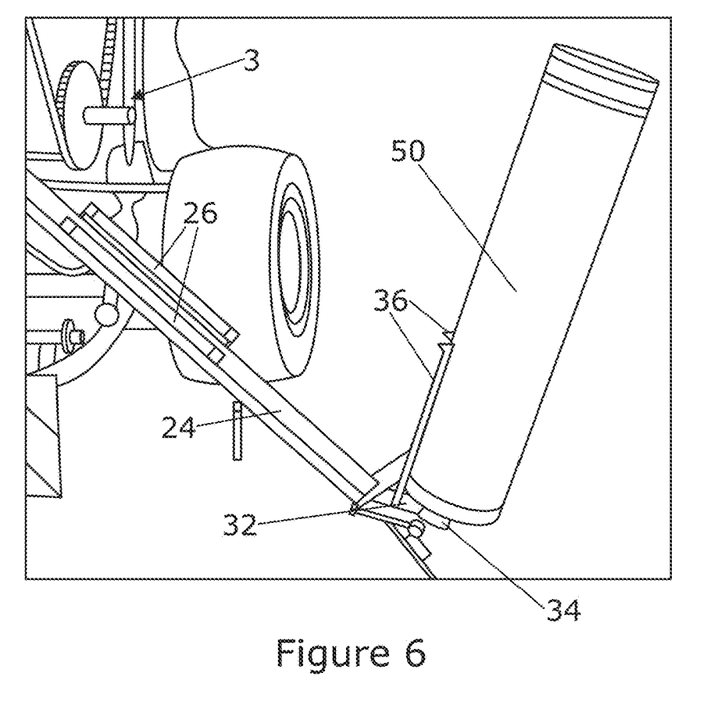
FIG. 6 shows a view of a fifth stage of loading the loading apparatus of FIG. 1.

The operator then lifts a roll of binding material 50 onto the loading apparatus locating a first end of the internal tube of the roll of binding material over the centring element 34 (FIG. 6). The operator can use the second side support elements 36 to guide the roll of binding material 50 into position.

Alternatively, where the centring element has been omitted, the operator may use the limbs of the U-shaped element 32 to locate the protruding end of the central tube of the roll of binding material 50.

The angle bar 30 is then pivoted back to the first position such that the second side support elements 36 are once again aligned with the first side support elements 26. If a latching mechanism is optionally provided, this is released prior to pivoting the angle bar back to this position. It can be seen that an upper portion of the roll of binding material 50 is now supported by the first and second side support elements 26 of the second part 24 of the carriage member 20 (FIG. 7) with the lower portion of the roll of binding material 50 supported by the first and second side support elements 36 of the angle bar 30.

Figure 8:
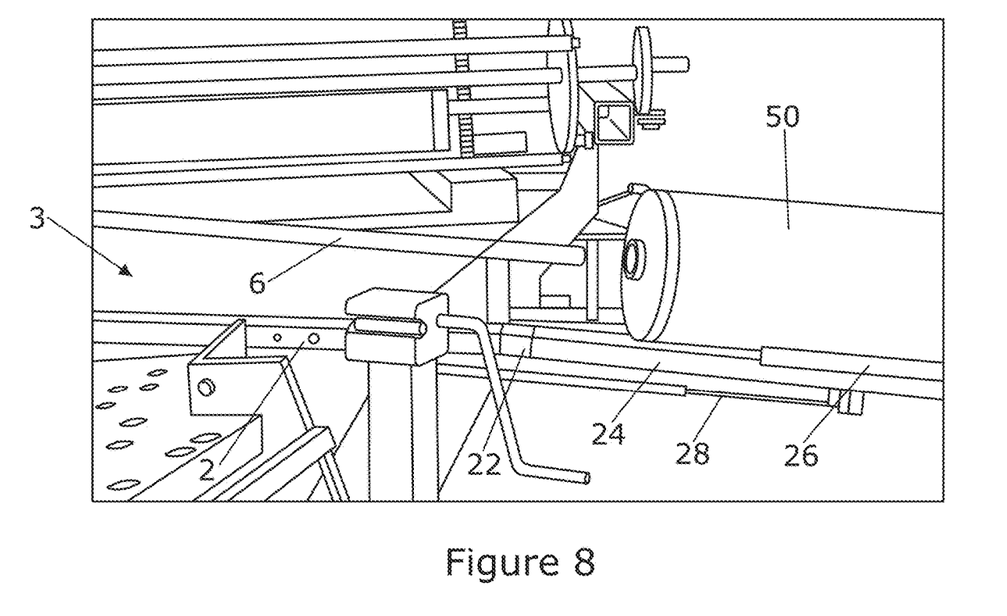
FIG. 8 shows a view of a seventh stage of loading the loading apparatus of FIG. 1.

Using the handle 4, the operator then lifts the distal end of the carriage member 20 to allow the carriage member 20 to be slid back along the first support member 2. (FIG. 8) It can be seen that as the second part 24 of the carriage member 20 is raised level with the first part 22, a second upper end of the central tube of the roll of binding material 50 is now aligned around the free end 10 of the second support member 6.

Figure 9:
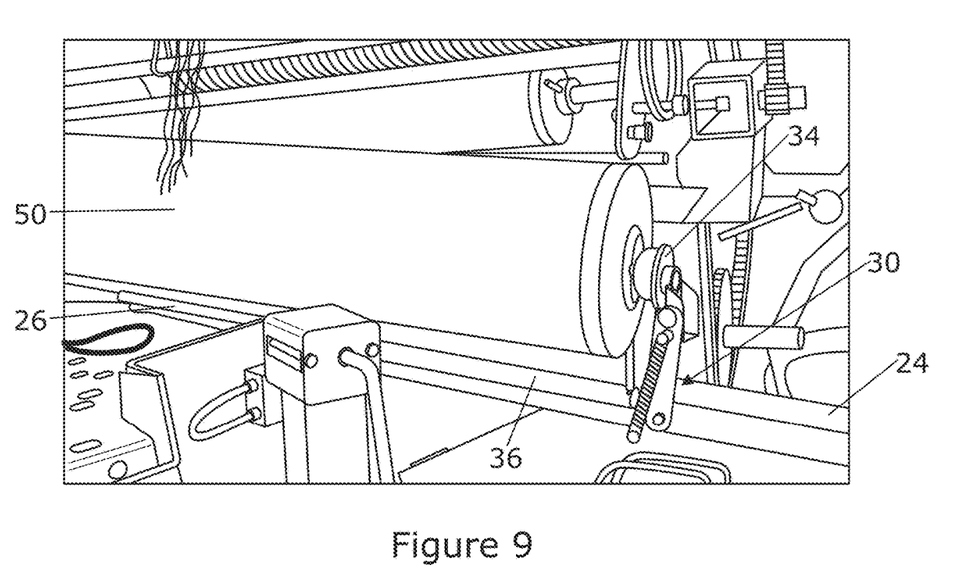
FIG. 9 shows a view of an eighth stage of loading the loading apparatus of FIG. 1.

The operator then pushes the carriage member 20 back along the first support member 2 until the centring element 34 abuts the free end 10 of the second support member 6 (FIG. 9).

The centring element 34 can now be released and pivoted away from the U-shaped element 32. The carriage member 20 can now be further moved toward the first side of the baler such that the roll of binding material 50 is fully loaded onto the second support member 6, where the second end of the second support member 6 passes though the limbs of the U-shaped element 32.

Figure 10:
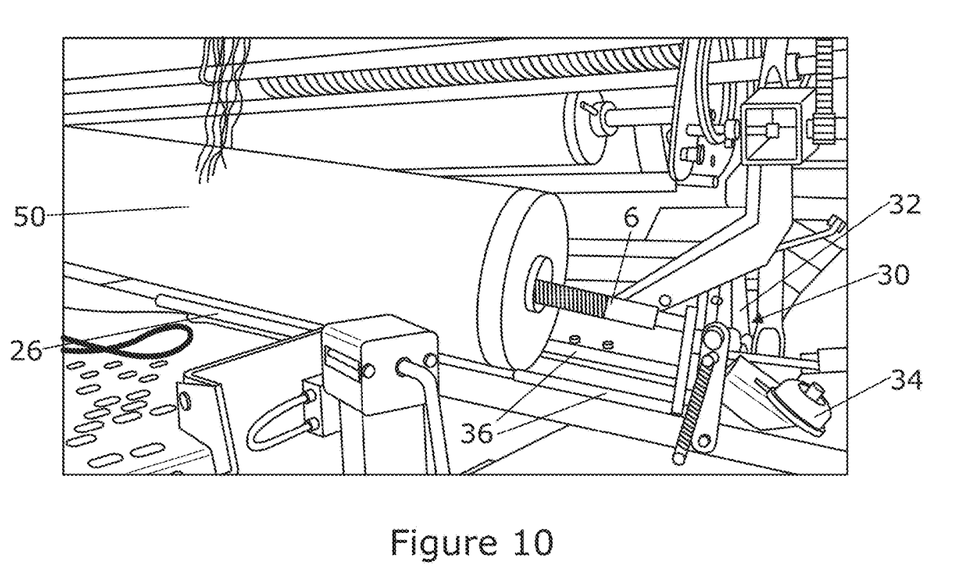
FIG. 10 shows a view of a ninth stage of loading the loading apparatus of FIG. 1.

It will be appreciated that as the roll of binding material 50 is loaded onto the second support member 6 the second upper end of the roll of binding material 50 is lifted away from the carriage member 20 (FIG. 10). This reduces the frictional contact between the carriage member 20 and the roll of binding material 50 as the carriage member 20 is pushed into position. In view of this, an operator may at this stage instead manually push the roll of binding material 50 along the second support member 6 into the desired position.

In the absence of the centring member the free end 10 of the second support member 6 passes though the limbs of the U-shaped element 32 and the operator can simply manually push the roll of binding material 50 along the second support member 6 into the desired position.

Once the carriage member 20 is in this position, the operator engages a locking or latching mechanism (not shown) to prevent relative movement of the first and second parts 22,24 of the carriage member.

Figure 11:
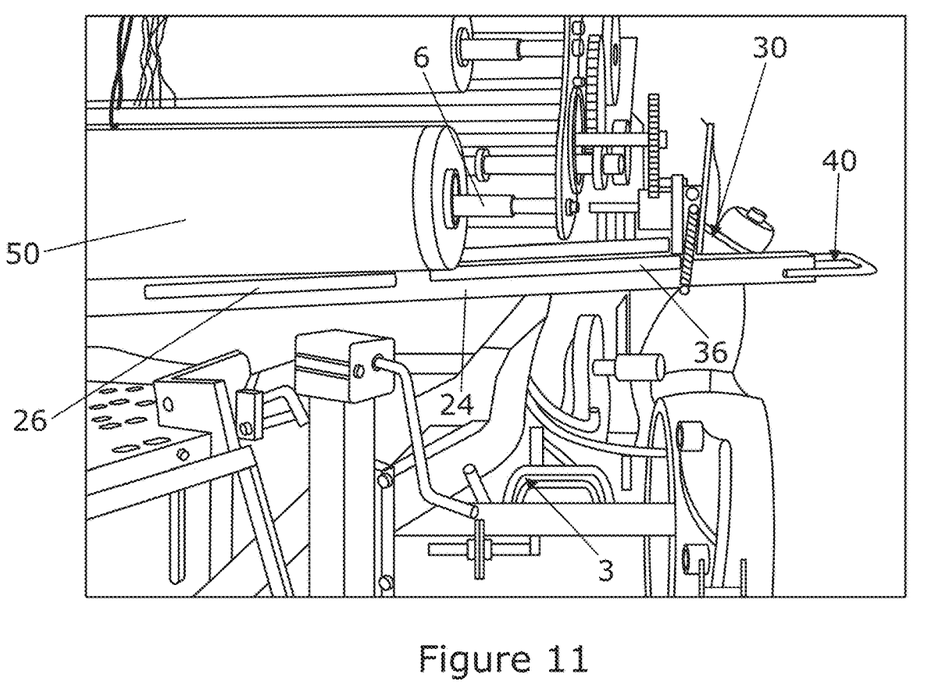
FIG. 11 shows a view of a penultimate stage of loading the loading apparatus of FIG. 1.

Using the handle 40, the operator then lifts the carriage member 20 and the first end of the roll of binding material 50 upwards such that the free end of the second support member 6 is engaged with the latching mechanism at the second side of the dispensing apparatus (FIG. 11). The roll of binding material 50 is now located within the storage apparatus.

Figure 12:
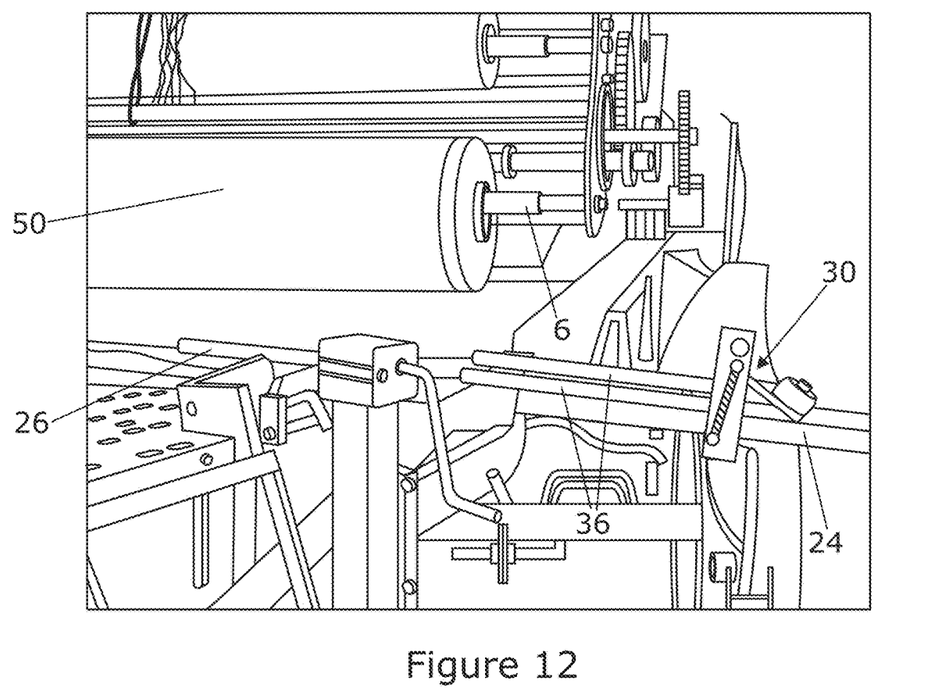
FIG. 12 shows a view of a final stage of loading the loading apparatus of FIG. 1.

The operator then lowers the carriage member 20 (FIG. 12).

This loading apparatus has as an advantage that all of the components are permanently mounted to the baler.

From reading the present disclosure, other modifications will be apparent to persons skilled in the art. Such modifications may involve other features which are already known in the field of round balers and component parts therefore and which may be used instead of or in addition to features already described herein.

The invention claimed is:

1. A loading apparatus for loading a roll of binding material into a dispensing apparatus of a baler from which the binding material may be dispensed, the loading apparatus comprising:
   a first support member supported at a first end, wherein the first end is connected to a frame of the baler; and
   a carriage member slidably mounted on the first support member, the carriage member comprising:
      a first part and a second part, wherein the second part of the carriage member is hingedly connected to the first part of the carriage member, the second part of the carriage member comprises a first set of first and second side support elements and a roll support element wherein a distal end of the second part of the carriage member comprises a pivotable angle bar, wherein a first limb of the pivotable angle bar comprising a second set of first and second side support elements and a second limb of the pivotable angle bar provided with the roll support element.

2. The loading apparatus of claim 1, wherein the distal end of the second part of the carriage member is provided with a handle.

3. The loading apparatus of claim 1, wherein the first and second parts of the carriage member are connected by biasing elements.

4. The loading apparatus of claim 3, wherein the biasing elements comprise pneumatic or hydraulic cylinders.

5. The loading apparatus according to claim 1, further comprising a first latching element between the carriage member and the first support element.

6. The loading apparatus of claim 1, wherein a second latching element is provided between the angle bar and the second part of the carriage member.

7. The loading apparatus of claim 1, wherein the roll support element comprises a centring element.

8. The loading apparatus of claim 7, wherein the centring element is mounted for pivotable movement on the second limb of the angle bar.

9. The loading apparatus of claim 8, comprising a third latching element between the centring element and the second limb of the angle bar.

10. A baler comprising:
   a baler frame; and
   a loading apparatus for loading a roll of binding material into a dispensing apparatus of the baler from which the binding material may be dispensed, the loading apparatus comprising:
      a first support member supported at a first end, wherein the first end is connected to the baler frame; and
      a carriage member slidably mounted on the first support member, the carriage member comprising:
         a first part and a second part, wherein the second part of the carriage member is hingedly connected to the first part of the carriage member, the second part of the carriage member comprises a first set of first and second side support elements and a roll support element wherein a distal end of the second part of the carriage member comprises a pivotable angle bar, wherein a first limb of the pivotable angle bar comprising a second set of first and second side support elements and a second limb of the pivotable angle bar provided with the roll support element.

11. The baler of claim 10, wherein the first end of the first support member is pivotally connected to the baler frame.

12. A method of operating the loading apparatus of claim 1 comprising:
   sliding the carriage member out along the first support;
   pivoting the second part of the carriage member down with respect to the first part of the carriage member;
   pivoting the angle bar from a first position to a second position to move the roll support element from a first position to a second position;
   locating a first end of a roll of binding material on the roll support element;
   pivoting the angle bar to move the roll support element from the second position to the first position;
   pivoting the second part of the carriage member up with respect to the first part of the carriage member; and
   sliding the carriage member back along the first support.

13. The method of claim 12, further comprising:
   unlatching the carriage member from the first support member before sliding the carriage member out along the first support; and
   relatching the carriage member to the first support member after sliding the carriage member back along the first support.

14. A method of operating the loading apparatus of the baler of claim 10, wherein the baler further comprises a binding material storage apparatus including a second support member releasably secured at a second end to a second side of the binding material storage apparatus, comprising:
   releasing the second end of the second support member from the second side of the binding material storage apparatus;
   sliding the carriage member out along the first support;
   pivoting the second part of the carriage member down with respect to the first part of the carriage member;
   pivoting the angle bar from a first position to a second position to move the roll support element from a first position to a second position;
   locating a first end of a roll of binding material on the roll support element;
   pivoting the angle bar to move the roll support element from the second position to the first position;
   pivoting the second part of the carriage member up with respect to the first part of the carriage member so as to introduce the second end of the second support member into a second end of the roll of binding material;
   sliding the carriage member back along the first support and so the roll of binding material over the second support member; and
   raising the first support member to reengage the second end of the second support member with the second side of the binding material storage apparatus.

* * * * *